(12) United States Patent
Ebana et al.

(10) Patent No.: US 9,581,215 B2
(45) Date of Patent: Feb. 28, 2017

(54) STEERING WHEEL VIBRATION SUPPRESSORS

(71) Applicant: Autoliv ASP, Inc., Ogden, UT (US)

(72) Inventors: Toshiaki Ebana, Kanagawa (JP); Christopher D. Morgan, Sterling Heights, MI (US); David R. Palm, Jr., Davisburg, MI (US)

(73) Assignee: AUTOLIV ASP, INC., Ogden, UT (US)

( * ) Notice: Subject to any disclaimer, the term of this patent is extended or adjusted under 35 U.S.C. 154(b) by 309 days.

(21) Appl. No.: 13/835,374

(22) Filed: Mar. 15, 2013

(65) Prior Publication Data

US 2014/0260774 A1  Sep. 18, 2014

(51) Int. Cl.
*B62D 1/11* (2006.01)
*F16F 7/104* (2006.01)
*B62D 1/10* (2006.01)
*B62D 7/22* (2006.01)

(52) U.S. Cl.
CPC .............. *F16F 7/104* (2013.01); *B62D 1/10* (2013.01); *B62D 7/222* (2013.01); *Y10T 74/20834* (2015.01)

(58) Field of Classification Search
CPC ..... B62D 1/10; F01D 21/045; Y10T 74/2119; Y10T 74/219; Y10T 74/2191
USPC ................................. 74/574.4; 188/373, 379
See application file for complete search history.

(56) References Cited

U.S. PATENT DOCUMENTS

| 2,379,175 | A | * | 6/1945 | Mulheim | ................. F16D 3/56 464/82 |
| 2,403,478 | A | * | 7/1946 | Burnat | .................... F16F 15/31 74/573.11 |
| 4,262,499 | A | * | 4/1981 | Pfeifer | ..................... F16D 3/56 464/82 |
| 4,588,198 | A | | 5/1986 | Kanazawa et al. | |
| 4,787,868 | A | * | 11/1988 | Hoshiba | ............... B63H 21/305 440/52 |
| 5,307,705 | A | * | 5/1994 | Fenelon | ................. B29C 70/84 264/242 |
| 5,709,605 | A | * | 1/1998 | Riefe | ..................... B62D 1/192 464/162 |

(Continued)

FOREIGN PATENT DOCUMENTS

DE           1480712        8/1969
DE    10 2011 050 521 A1 * 11/2012    ............... B62D 1/11
(Continued)

OTHER PUBLICATIONS

JPO Machine translation of JP 2000-65084, Kurita, Mar. 2000.*
(Continued)

*Primary Examiner* — Vinh Luong
(74) *Attorney, Agent, or Firm* — Stoel Rives LLP

(57) ABSTRACT

Vibration suppressors can include a resiliently flexible spring system that may be mounted at an exterior of a steering wheel of a vehicle, such as at a hub portion of a steering wheel armature. The spring system can include a fixable portion and a displaceable portion that is configured to be displaced relative to the fixable portion. A mass system can be coupled to the displaceable portion of the spring system and may also be at an exterior of the steering wheel.

12 Claims, 11 Drawing Sheets

(56) References Cited

U.S. PATENT DOCUMENTS

| | | | |
|---|---|---|---|
| 6,182,531 B1 * | 2/2001 | Gallagher | F01D 21/045 |
| | | | 464/101 |
| 6,508,343 B2 * | 1/2003 | Misaji et al. | 188/379 |
| 7,025,681 B2 * | 4/2006 | Geislinger | F16D 3/56 |
| | | | 464/100 |
| 8,689,951 B2 * | 4/2014 | Geislinger | F16F 15/161 |
| | | | 188/268 |
| 2002/0144873 A1 | 10/2002 | Kato et al. | |
| 2004/0007858 A1 | 1/2004 | Simonian et al. | |
| 2004/0060789 A1 * | 4/2004 | Hamada | 188/373 |
| 2007/0137415 A1 | 6/2007 | Thomas | |
| 2009/0078078 A1 | 3/2009 | Manzoor | |
| 2013/0255437 A1 * | 10/2013 | Hull | F16F 15/315 |
| | | | 74/572.11 |

FOREIGN PATENT DOCUMENTS

| | | | | |
|---|---|---|---|---|
| FR | 780874 | * | 5/1935 | B62D 1/11 |
| FR | 2463708 | * | 2/1981 | B62D 1/11 |
| FR | 2950308 | * | 3/2011 | B62D 1/11 |
| GB | 2431898 A | * | 5/2007 | |
| JP | 63106120 | | 11/1988 | |
| JP | 11139329 | | 5/1990 | |
| JP | 2310173 | | 12/1990 | |
| JP | 3010971 | | 1/1991 | |
| JP | 5-238394 | * | 9/1993 | |
| JP | 7-14716 | * | 2/1995 | B62D 1/10 |
| JP | 2000-65084 | * | 3/2000 | F16D 3/64 |
| JP | 2001-71916 | * | 3/2001 | B62D 1/10 |
| JP | 2006-138330 | * | 6/2006 | F16F 9/14 |
| KR | 2003/0050205 | | 6/2003 | |
| KR | 2004/0037399 | | 5/2004 | |
| KR | 2004/0051172 | | 6/2004 | |
| KR | 2006/0072612 | | 6/2006 | |
| KR | 2007/0050649 | | 5/2007 | |
| KR | 2008/0017574 | | 2/2008 | |
| WO | WO 9523299 A1 | * | 8/1995 | B60R 21/05 |
| WO | WO 2013/149626 | * | 10/2013 | |
| WO | WO 2014/149178 A1 | * | 9/2014 | B62D 1/11 |

OTHER PUBLICATIONS

EPO Machine translation of DE 102011050521 A1, Manfred et al., Nov. 2012.*
EPO Machine Translation of WO 9523299 (A1), Malvy, Aug. 1995.*
EPO Machine Translation of FR 2463708, Brun, Feb. 1981.*
International Search Report and Written Opinion for PCT/US2014/012657 filed Jan. 23, 2014, mailed May 12, 2014.

* cited by examiner

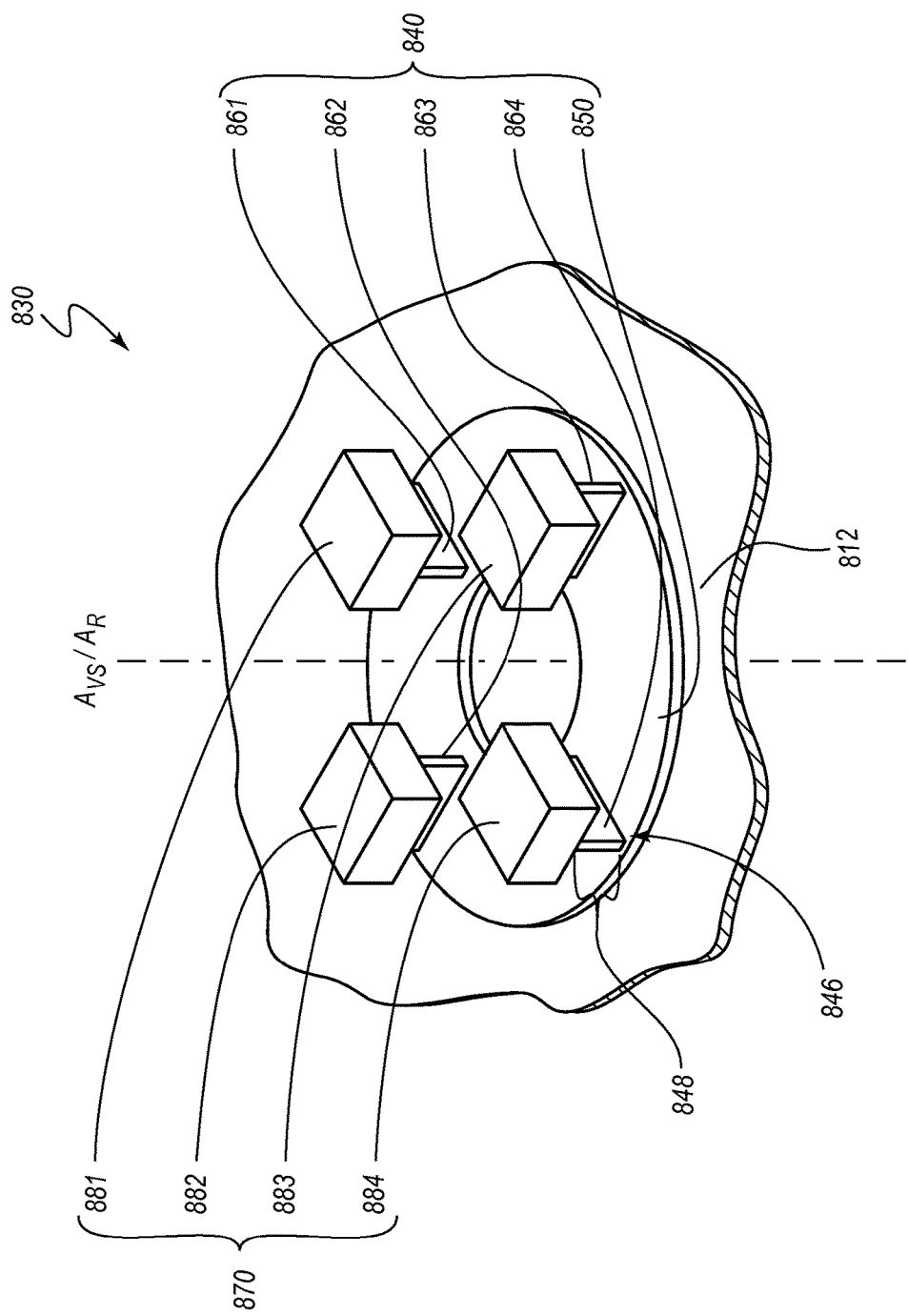

STEERING WHEEL VIBRATION SUPPRESSORS

TECHNICAL FIELD

The present disclosure relates to vibration suppressors for vehicular steering assemblies.

BRIEF DESCRIPTION OF THE DRAWINGS

The written disclosure herein describes illustrative embodiments that are non-limiting and non-exhaustive. Reference is made to certain of such illustrative embodiments that are depicted in the figures, in which:

FIG. 11 is a perspective view of another embodiment of a vibration suppressor in a natural or unperturbed state in which four mass elements are each attached to a steering wheel hub, each via a separate spring element.

DETAILED DESCRIPTION

Figure 1:
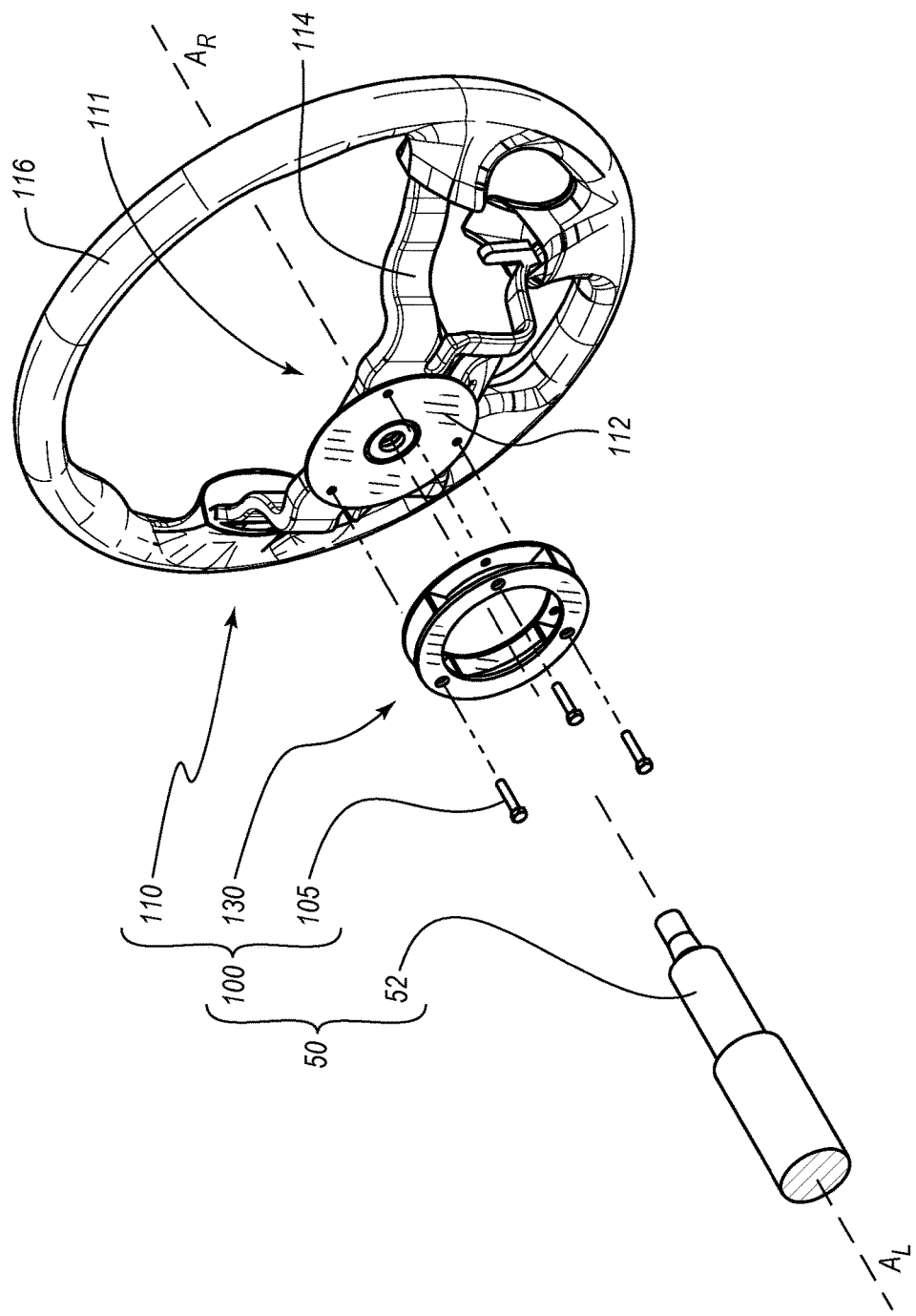
FIG. 1 is an exploded perspective view of an embodiment of a vibration suppressor as installed proximally on a hub located on the front side of a steering wheel armature, opposite the side that faces the operator of a vehicle.

Steering wheel shimmy, or the back-and-forth rotational vibrations about the longitudinal axis of the steering column, can result from a variety of causes, including, but not limited to, imbalance in suspension systems, mechanical play in steering systems, improper alignment of the tires to which the steering mechanism is attached, unbalanced tires, etc. If severe enough, such steering wheel shimmy can be dangerous, causing operators of vehicles to lose their grip on the steering wheel. Such steering wheel shimmy can otherwise be bothersome, troublesome, or annoying to the operator of the vehicle experiencing it.

Steering wheel shimmy can involve back-and-forth rotational vibrations of a particular regularity. As such, steering wheel shimmy can be said to exhibit a particular frequency. The frequency of the shimmy is related to the cause of the shimmy, and different causes may result in shimmies of different frequencies. In some arrangements, a single steering system may have multiple frequencies at which shimmy is particularly large.

Countermeasures to reduce steering wheel shimmy have involved increasing the mass of the steering wheel itself. In such situations, the increased mass of the steering wheel assembly results in increased inertia of the steering wheel assembly, which dampens shimmy (e.g., suppresses or absorbs the rotational vibrations) by simply resisting rotational travel caused by rapid rotational vibrations.

One disadvantage of the foregoing method of damping steering wheel shimmy is increased cost of manufacture, due to the massive steering wheel component, which would generally be made of some sort of dense metal. Another disadvantage would be the weight added to the vehicle by such a component, and the reductions in efficiency (e.g., fuel efficiency) associated with increased overall weight. Still another disadvantage would be the limitations on the design of steering wheels necessitated by incorporating such a massive component. Further, if such a solution were taken to the extreme, a massively weighted steering wheel would be difficult to turn due to its increased moment of inertia, which might also cause undue wear and tear on the steering column and components of the steering system.

Various embodiments disclosed herein address, ameliorate, and/or eliminate one or more of the foregoing limitations. In some embodiments, vibration suppressors are effective at suppressing steering wheel vibration or shimmy but are not excessively massive. In other or further embodiments, vibration suppressors are configured to reduce specific frequencies of back-and-forth rotational vibrations. A vibration suppressor designed to reduce a shimmy of a particular frequency of vibration may be said to be "tuned" to that frequency of vibration. Such a tuned vibration suppressor can, in some instances, be more effective than traditional vibration suppressors that merely increase the rotational inertia of the steering wheel. Certain embodiments of shimmy dampers, or vibration suppressors, and shimmy damper assemblies disclosed herein have improved dampening, size, and/or weight characteristics. Other or further embodiments can be tuned to reduce vibrations of specific resonant frequencies. Other or further properties and advantages of various embodiments will be apparent from the disclosure herein, the figures, and/or the claims.

It will be readily understood that the components of the embodiments as generally described and illustrated in the figures herein could be arranged and designed in a wide variety of different configurations. Thus, the following more detailed description of various embodiments, as represented in the figures, is not necessarily intended to limit the scope of the present disclosure, but is merely representative of various embodiments. While the various aspects of the embodiments are presented in figures, the figures are not necessarily drawn to scale unless specifically indicated.

The phrases "connected to" and "coupled to" are used in their ordinary sense, and are broad enough to refer to any suitable coupling or other form of interaction between two or more entities, including mechanical, fluid and thermal interaction. Two components may be coupled to each other even though they are not in direct contact with each other. The phrases "attached to" or "attached directly to" refer to interaction between two or more entities which are in direct contact with each other and/or are separated from each other and/or coupled to each other by a fastener of any suitable variety (e.g., mounting hardware, adhesive, stitching, weld), regardless of whether the fastener extends through additional components.

As used herein, the term "steering wheel shimmy," or "shimmy," is defined as rotational back-and-forth vibrations in a plane that is perpendicular to a longitudinal axis of the steering column to which the steering wheel assembly is attached. The terms "shimmy damper," "shimmy absorber," "vibration damper," "vibration absorber," "rotational vibration suppressor," "vibration suppressor," or "vibration suppressor assembly," are used interchangeably to refer to devices disclosed herein that are designed to lessen steering wheel shimmy. The term "device" may also be used herein to refer to a vibration suppressor.

As explained in more detail below, embodiments of vibration suppressors can include a resiliently flexible spring system that are coupled with a mass system. In certain embodiments, the resiliently flexible spring system of the vibration suppressor comprises at least one spring element, and may comprise a plurality of spring elements. Similarly, the mass system of the device may include at least one mass element, and may include multiple mass elements that are individually coupled with separate spring elements. In other or further embodiments, the mass system may include one or more components that are used to connect the spring element to the mass element. In certain embodiments, the spring system and the mass system can be oriented relative to a rotational axis of the steering column of the vehicle and/or an axis of rotation of a steering wheel armature such that a moment of inertia of the vibration suppressor is centered on the axes. The mass system may be capable of rotating about the axes, and in further embodiments, the spring system may be configured to restrict movement of the mass system along a path that is at a fixed radial distance from the axes. These and other features of various embodiments will be apparent from the disclosure herein.

FIG. 1 depicts an embodiment of a vibration suppressor 130, which may be installed in a steering assembly 50 of a vehicle. The steering assembly 50 comprises a steering column 52, to which a steering wheel assembly 100 is attached. The steering wheel assembly 100 can include a steering wheel armature 110 that is attached to the vibration suppressor 130 in any suitable manner, such as via mounting hardware 105. In certain embodiments, a longitudinal axis $A_L$ of the steering column 52 is coincident with a rotational axis $A_R$ of the steering wheel assembly 100 when the steering assembly 50 is in an assembled state. In the illustrated embodiment, the vibration suppressor (which may also be referred to as the "device") 130 is mounted to a hub 112 that is located on the front side (i.e., the side facing the front of the vehicle in which the steering assembly is installed) of the steering wheel armature 110. The steering wheel armature 110 further comprises the steering wheel 116, which is connected to the rest of the armature through a plurality of arms 114. In the illustrated embodiment, the vibration suppressor 130 is affixed to the hub 112 via mounting hardware 105 that comprises any suitable fastener, such as bolts. In the illustrated embodiment, the vibration suppressor 130 is mounted to the steering wheel armature 110, by way of the hub 112, such that the rotational axis of the steering wheel $A_R$ passes through the center of the device 130, thereby aligning the center of mass of the device 130 with the rotational axis $A_R$ of the steering wheel armature 110. In some embodiments, such an arrangement may allow for efficient absorption of rotational back-and-forth vibrations (shimmy) occurring within the steering assembly. The hub 112 and the arms 114 of the steering wheel armature 110 may be said to define at least a portion of a frame 111 of the steering wheel armature 110 to which the steering wheel 116 is mounted.

Figure 2:
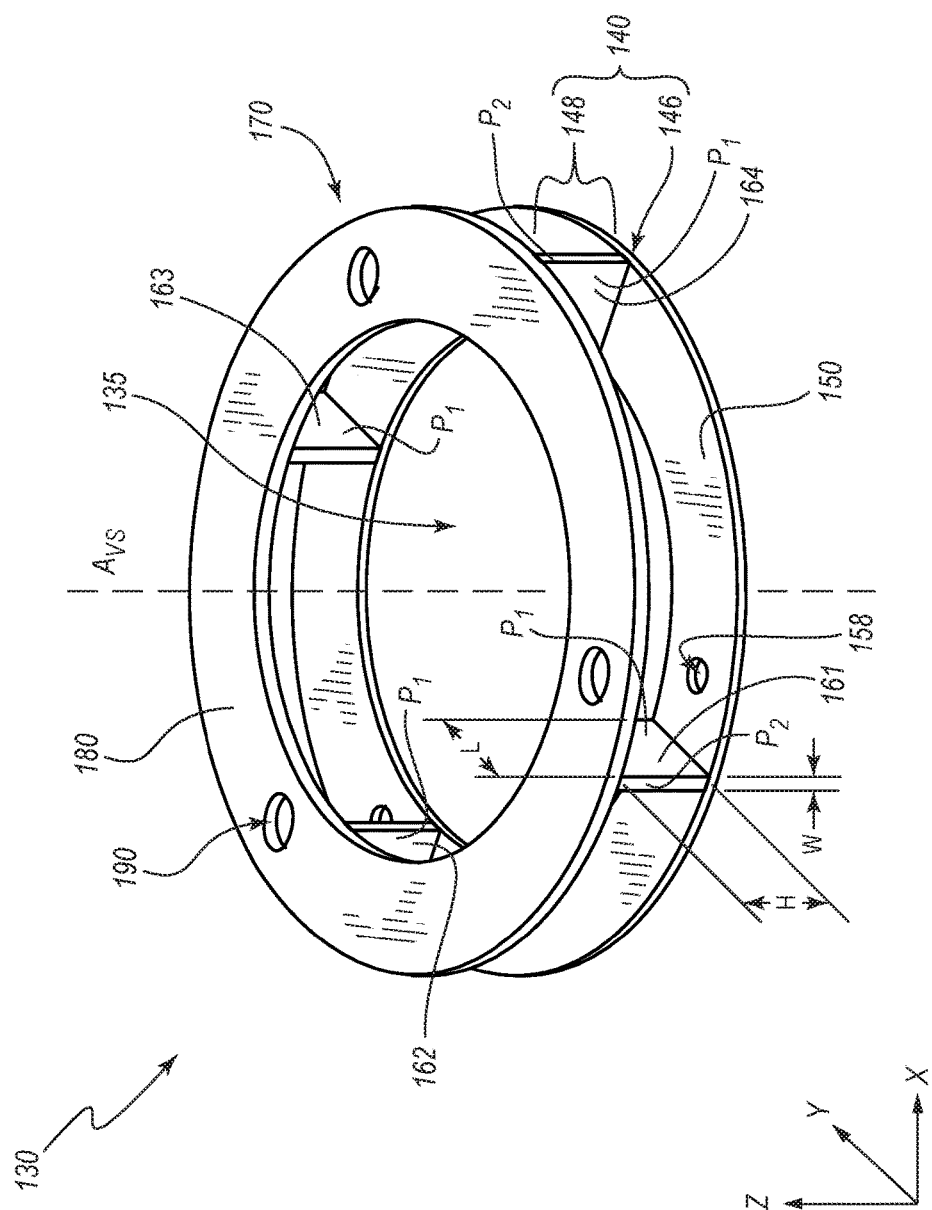
FIG. 2 is an enlarged perspective view of the vibration suppressor of FIG. 1 in a natural or unperturbed state.
Figure 3:
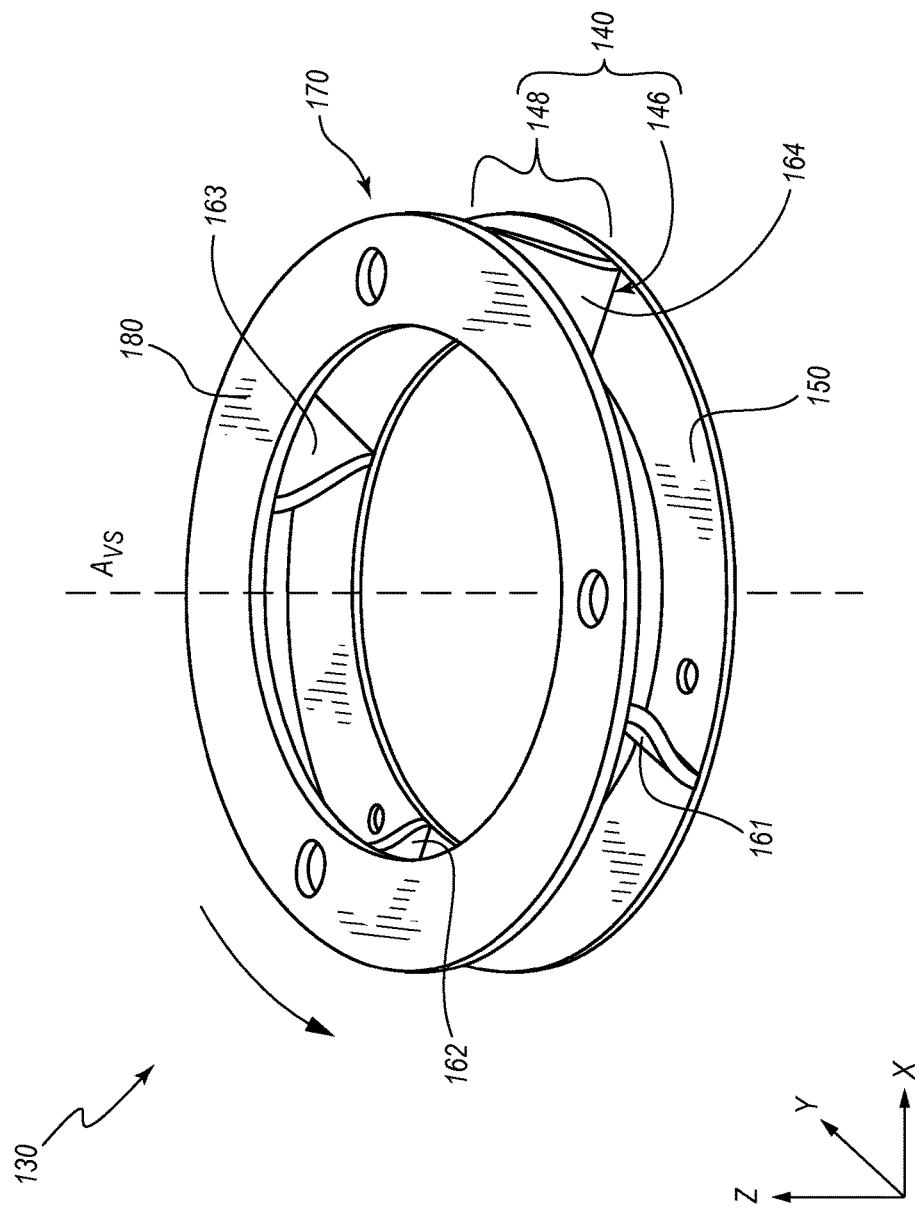
FIG. 3 is a perspective view of the vibration suppressor of FIG. 1 in a displaced or perturbed state in which part of device has undergone rotational flexion relative to the rest of the device, in response to rotational forces transmitted through the steering column and steering wheel armature.

FIG. 2 and FIG. 3 provide enlarged views of the illustrative embodiment of the vibration suppressor 130 of FIG. 1, with further details of the device identified and discussed. In the illustrated embodiment, the vibration suppressor 130 is shown as having its own axis, the vibration suppressor axis $A_{VS}$, which passes through an opening 135 at a center of the device. The elements of the illustrated vibration suppressor 130 may be arranged relative to this vibration suppressor axis $A_{VS}$, which, when the device is installed on a steering wheel armature, as depicted in FIG. 1, can be coincident with the rotational axis of the steering wheel $A_R$.

FIG. 2 depicts the vibration suppressor 130 in a native, resting, or natural state; a state in which the vibration suppressor 130 is not responding to rotational force about the vibration suppressor axis $A_{VS}$. In contrast, FIG. 3 depicts the vibration suppressor 130 in a displaced state; a state in which it is responding to an applied rotational force about the vibration suppressor axis $A_{VS}$. In both figures, the illustrated device comprises two ring-shaped elements—namely, a mass element 180 and mounting base 150, which are coupled to each other via four fin-shaped, or blade-shaped, radially configured spring elements 161, 162, 163, 164, as further described below. L is a length, W is a width, H is a height, P1 is a first plane, and P2 is a second plane.

As depicted in FIG. 2, the vibration suppressor 130 comprises a resiliently flexible spring system 140, coupled to a mass system 170. As illustrated, four equivalent spring elements 161, 162, 163, 164 are equal components of the resiliently flexible spring system 140, and each spring element 161, 162, 163, 164 is depicted as a blade or fin connecting a ring-shaped mass element 180 to a mounting base 150. In such embodiments, and relative to the vibration suppressor axis $A_{VS}$, the spring system 140 comprises a plurality of radially positioned, and evenly distributed identical spring elements 161, 162, 163, 164 that are configured to resist radial movement of the mass system 170 relative to the vibration suppressor axis $A_{VS}$, but are configured to permit rotational movement of the mass system 170 about the vibration suppressor axis $A_{VS}$. In such embodiments, the plurality of spring elements 161, 162, 163, and 164 comprise a plurality of blades that are each configured to resist bending about two mutually orthogonal axes and are each configured to bend about a third axis that is orthogonal to each of the other two axes, and wherein the third axis of each blade is perpendicular to the rotational axis of the steering wheel armature. Stated otherwise, the spring elements 161, 162, 163, 164 may be relatively stiff and resistant to being bent along an axis that is parallel to the vibration suppressor axis $A_{VS}$ and that extends longitudinally through the spring elements 161, 162, 163, 164. The spring elements 161, 162, 163, 164 may likewise be resistant to bending along an axis that is normal to the largest faces of the spring elements 161, 162, 163, 164. However, the spring elements 161, 162, 163, 164 may be less stiff and more prone to being bent along an axis that is perpendicular to the vibration suppressor axis $A_{VS}$ and that extends radially through the spring element 161, 162, 163, 164. In some embodiments, attachment of the spring elements 161, 162, 163, 164 to the mass element 180 and the mounting base 150 can stiffen the spring elements and reduce their proclivity to bending about axes that are parallel to the vibration suppressor axis $A_{VS}$ and extend longitudinally through the spring elements 161, 162, 163, 164.

As depicted in FIG. 2, the resiliently flexible spring system 140 can comprise a fixable portion or first portion 146 and a displaceable portion or second portion 148. As illustrated for this embodiment, the fixable portion 146 is attached to a mounting base 150. As further discussed below, the mounting base 150 may not be present in some embodiments, as the spring elements 161, 162, 163, 164 can be mounted directly to a steering wheel armature frame, and in some embodiments, the elements can specifically be mounted to a hub portion of the frame. In either case, the fixable portion 146 of the spring elements 161, 162, 163, 164 can comprise the portions of the spring elements that are furthest from the mass element 180. In vehicles where the longitudinal axis as defined by the steering column $A_L$ is coincident with the rotational axis of the steering wheel armature $A_R$, the fixable portion 146 of the spring system 140 may be mounted in a fixed position relative to the longitudinal axis of the steering column of the vehicle, and can be configured to rotate in unison with the steering column about that axis. Similarly, in some embodiments, when the vibration suppressor 130 is mounted to the steering wheel armature as part of a steering wheel assembly (as depicted in FIG. 1), the fixable portion 146 can be mounted in a fixed position relative to a steering wheel armature of the vehicle and can be configured to rotate in unison with the steering wheel armature about the rotational axis of the steering wheel armature. In such embodiments, the vibration suppressor axis $A_{VS}$ can be coincident with the rotational axis of the steering wheel armature $A_R$.

In the illustrated embodiment, the resiliently flexible spring system 140 further comprises a displaceable portion 148 that is configured to be displaced relative to the fixable portion 146 of the spring system 140. The displaceable portion 148 can be resiliently flexible so as to return to a natural orientation after a displacement force has been removed from it. In the illustrated embodiment, the displaceable portion 148 of the spring system 140 includes the upper end of each of the spring elements 161, 162, 163, 164. The displaceable portion 148 of the spring system 140 can be coupled to the mass system 170. In some embodiments, in vehicles where the longitudinal axis as defined by the steering column $A_L$ is coincident with the rotational axis of the steering wheel armature $A_R$, once mounted, the rotational inertia of the mass system 170 can be centered on the longitudinal axis of the steering column when the fixable portion of the spring system is mounted in the fixed position relative to the steering column. Similarly, in some embodiments, when the vibration suppressor 130 is mounted to a steering wheel armature, the rotational inertia of the mass system 170 can be centered on the rotational axis of the steering wheel armature $A_R$ when the fixable portion of the spring system is mounted in the fixed position relative to the rotational axis of the steering wheel armature.

The spring elements 161, 162, 163, 164 can comprise components of the spring system 140 that, from an initial resting position, provide the ability to respond to axial rotational force applied to the vibration suppressor 130, by flexing or bending, before returning to their resting position once the rotational force has been withdrawn. When the resiliently flexible spring system comprises a plurality of such spring elements, the individual spring elements may or may not be structurally or functionally equivalent, although in all of the illustrated embodiments they are depicted as being at least structurally equivalent. When a plurality of spring elements are present as parts of a single spring system, they all may be functionally coupled to some component of the mass system, and may cooperate to contribute to the ability of the device to suppress steering wheel shimmy.

As previously discussed, in certain embodiments, each spring element comprises a "fixable portion" and a "displaceable portion," each portion having a different function, as suggested by their name. In some embodiments, the "fixable portion" of a spring element defines that portion that is directly affixed to some part of the steering wheel armature, or a steering wheel armature hub, or to some part of the steering column, depending upon where the device is installed. In other embodiments, such as where a mounting base 150 is provided as a component of the vibration suppressor, the "fixable portion" of a spring element defines that portion of a spring element that is directly affixed to the mounting base. Whether directly attached to the steering wheel armature, a steering wheel armature hub, or a steering column, or attached to any of these by way of a mounting base, the fixable portion can be configured to be mounted in a fixed position relative to the steering wheel armature or steering column of the vehicle, and can rotate in unison with the steering wheel armature or steering column about its respective axis of rotation (i.e., about the axis of rotation of the steering wheel, or about the longitudinal axis of the steering column).

The "displaceable portion" of a spring element can be defined as that portion of the spring element between the fixable portion of the spring element and the position on the spring element to which a mass element, or some other part of the mass system, is attached. Moreover, the displaceable portion of the spring element is that portion, as the name implies, that can be displaced from its resting position when axial rotational force is applied to the vibration suppressor, but that returns to its original resting, or native, position after the axial rotational force is removed.

The composition and geometry of the spring elements 161, 162, 163, 164 used in various embodiments of vibration suppressors 130 can be chosen from a wide range of options. For example, the spring elements 161, 162, 163, 164 may be made from one or more durable and/or resiliently flexible materials, such as, for example, a metal that tends to return to its original, resting location, following deflection or bending under the influence of force. In some embodiments this metal will be a ferrous metal, such as iron or steel, or alloys of thereof. In other embodiments this metal can be a non-ferrous metal. In still other embodiments the material used to make the spring elements of the disclosed vibration suppressors can be a polymer, such as a plastic polymer, or a composite material, such as a fiber reinforced polymer. The material or materials used for the spring elements may be sufficiently resistant to permanent bending such that they resist adopting a shape that is permanently altered from its original shape, particularly after being subjected to the amount and type of force that is expected to be applied during the normal operation of the vibration suppressor in which the spring element serves to absorb the axial rotational vibrations propagated through the steering system to the steering column or steering wheel armature. In other words, the material used to fabricate the spring elements of the spring system of the disclosed vibration suppressors can impart resilient spring-like action on the mass system of the device, enabling the mass system to deflect from its initial resting point when axial rotational force is applied, and to return to that same resting point when the force is withdrawn.

Although the spring elements of the spring system of the disclosed vibration suppressor assemblies can have many different possible configurations, various embodiments may have configurations that facilitate substantial absorption of steering wheel shimmy (e.g., rotational vibrations about the axis of rotation of the steering wheel armature or steering column). In the embodiment illustrated in FIGS. 1-3, one construction and configuration of spring elements that can be employed is that of metal blades or "fins" that are mounted radially from, and in respective planes that are parallel with, the rotational axis of the steering wheel armature, or the longitudinal axis of the steering column. In other or further embodiments, any material and/or geometry that allows displacement of the displaceable portion of the spring elements in a rotational direction while also resisting motion in all other directions may be used. For example, in the illustrated embodiment, the spring elements permit rotation about the longitudinal axis, which corresponds to the Z-axis, within an X-Y plane that corresponds with the direction of back-and-forth rotational vibrations transmitted through the steering column or steering wheel armature. However, the spring elements substantially prevent movement of the mass elements toward or away from the Z-axis.

The choice of materials used to make the spring elements and/or the dimensions or other physical characteristics of the spring elements can influence the operational characteristics of the spring elements. For example, in some instances, thicker spring elements and/or spring elements made with stiffer materials, can be more resistant to flexion by a given amount of applied rotational force. Conversely, thinner spring elements and/or spring elements made from more flexible materials, can be expected to be less resistant to flexion by a given amount of applied rotational force. Accordingly, in some arrangements, by altering the choice of the specific materials used to make the spring elements and/or through adjustments in the thicknesses and overall dimensions of the individual spring elements, vibration suppressors can be "tuned" to respond to a particular amount of rotational force and/or a particular frequency at which rotational forces are alternated. In other or further arrangements, tuning can be accomplished through adjustments to the positioning of the spring elements relative to the intended axis of rotation $A_R$ of the vibration suppressor assembly.

Although the spring elements 161, 162, 163, 164 are depicted as having identical dimensions and identical positioning relative to the axis of rotation of the vibration suppressor 130 in FIGS. 1-3, in other embodiments, the spring elements may have different dimensions or position with respect to the axis of rotation. In other or further embodiments, independent of whether the dimensions and orientations of the spring elements 161, 162, 163, 164 are the same and/or symmetrical, the various spring elements may have the same or different compositions. For example, in some embodiments, each spring element is made of a different material and/or has different overall dimensions and/or has different positioning geometries, as compared with one or more of the remaining spring elements, such that different spring elements of the spring system will flex or bend differently in response to different frequencies of rotational vibration or shimmy. In some embodiments, the use of different materials, dimensions and/or positioning geometries in different spring elements incorporated into a single vibration suppressor can allow the device to beneficially respond to multiple rotational frequencies of movement, thereby allowing a single device to absorb or dampen multiple frequencies of shimmy. In some embodiments, when different materials or geometries are used for different spring elements in the same vibration suppressor, they, and the mass element(s) attached to them, may be balanced relative to the rotational axis, such as, for example, by matching the materials and geometries of the spring elements that are positioned on opposite sides of the axis of rotation of the vibration suppressor.

In the illustrated embodiment, the spring element 161, 162, 163, 164 are identically sized, oriented, and formed of identical materials. The spring elements 161, 162, 163, 164 are balanced about the rotational axis of the vibration suppressor 130. As further described below, in some embodiments, a vibration suppressor 130 may include multiple vibration suppressor devices, with each having a spring system 140 and a mass system 170 that is tuned to resonate at a different frequency from the remaining vibration suppressors. Each spring system 140 and/or mass system 170 may be balanced relative to the rotational axis of the vibration suppressor, steering wheel armature, and/or steering column.

For the embodiment illustrated in FIG. 1, the mass system 170 is spaced from the steering wheel 116, and thus is not incorporated into an interior of the steering wheel 116. Stated otherwise, the mass system 170 is mounted at an exterior of the steering wheel 116 (e.g., is not incorporated into a cavity defined by the steering wheel), although the mass system 170 has a smaller diameter than that defined by the steering wheel 116. Such an arrangement can allow for simple fabrication of the steering wheel assembly 100, as the mass system 170 need not be positioned within the steering wheel 116 itself. Rather, the mass system 170, and the vibration suppressor 130 more generally, can be mounted at any suitable position of the steering wheel assembly 100 without regard to a particular size, shape, or other quality of the steering wheel 116.

In the illustrated embodiment shown in FIG. 2 and FIG. 3, the mass system 170 comprises a single ring-shaped mass element 180 that is configured to fully encompass the rotational axis of the steering wheel armature $A_R$, once the device is mounted. In certain of such embodiments where the mass system comprises a single ring-shaped mass element, and the spring system comprises a plurality of blades that are attached to the mass element, the mass element can be oriented transversely to the rotational axis of the steering wheel armature after the device is mounted. Such an arrangement may balance the mass element 180 relative to the rotational axis. In the illustrated embodiment, the plurality of blades (spring elements 161, 162, 163, 164) are elongated radially away from the rotational axis of the steering wheel armature.

The term "mass element" refers to a component of the mass system of the vibration suppressor that provides physical mass and an associated moment of rotational inertia. The term "rotational inertia" may also be referred to as a moment of inertia, mass moment of inertia, polar moment of inertia, or angular mass. During operation of an installed vibration suppressor 130, the mass system 170 may rotate about the rotational axis of the steering wheel armature, or the longitudinal axis of the steering column, but only to the degree allowed by the inhibition arising from the functionally attached, resiliently flexible spring system 140.

In the present disclosure, the terms "rotational force," "axial rotational force," or "torsion" can refer to the forces applied to the vibration suppressor through the rotation of the steering wheel armature or steering column about their respective axes of rotation, particularly as a result of the rapid back and forth rotational movements that result in steering wheel shimmy. In vehicles where the steering wheel armature is attached directly in line with the steering column, the rotational axis of the steering wheel can be coincident with the longitudinal axis of the steering column. In vehicles where the steering wheel armature is attached to the steering column through an adjustable joint, as with vehicles equipped with tilting wheel or similar feature, the rotational axis of the steering wheel armature may or may not be coincident with the longitudinal axis of the steering column, but the rotational forces generated around the longitudinal axis of the steering column may still be translated to the axis of rotation of the steering wheel armature by way of the functional coupling between the steering column and the steering wheel armature. A functional coupling between the steering column and the steering wheel armature can allow for the vibration suppressor 130 to effectively reduce steering wheel shimmy when it is affixed to the steering wheel armature. As discussed below, in other or further embodiments, the vibration suppressor 130 can be attached to the steering column of the vehicle with similar effect.

The term "ring-shaped," as used above with respect to the mass element 180, does not necessarily imply circular. For example, the term "ring-shaped" can also include any suitable shape that fully or partially encompasses or encloses a rotational or longitudinal axis (e.g., square, pentagon, hexagon, heptagon, octagon, etc. or portions of these shapes). The ring-shaped mass element 180 may be positioned transversely to the rotational axis on the part of the steering system on which it is mounted, as previously mentioned. For example, when a vibration suppressor comprising a ring-shaped mass element is mounted to a steering wheel armature of a vehicle, the mass element 180 can define upper and/or lower planes that are perpendicular to the rotational axis of the steering wheel armature 110. In other embodiments, such as discussed below with respect to FIG. 10, a ring-shaped mass element may be positioned transversely relative to the rotational axis of the steering column 52.

In some embodiments, a ring-shaped or cylindrical mass element 180 can be advantageous, as such an element can define an opening (e.g., a portion of the opening 135) that is concentric with an axis of rotation of the masse element. This opening may facilitate the attachment of the vibration suppressors at various locations in and on the steering assembly, and allows for other components to pass through it. Embodiments of vibration suppressors with ring-shaped mass elements can be mounted, for example, on either the front or rear surfaces of steering wheel armatures, either directly or by way of a central hub plate, and either internally or externally with respect to the steering wheel armature itself. In other or further embodiments, a ring- or cylinder-shaped mass element can be mounted concentrically with and surrounding some portion of the steering column (see FIG. 10).

In certain embodiments involving ring-shaped or cylindrical mass elements, or any other suitably shaped mass element (or elements), the center of mass of the mass element and/or the mass system can be located at a position that is coincident with the axis of rotation of the element of the steering assembly to which the vibration suppressor is affixed. Hence, for embodiments installed on steering wheel armatures, the mass center of the mass element can be coincident with the rotational axis of the steering wheel armature. For embodiments installed on steering columns, the mass center of the mass element can be coincident with the rotational or longitudinal axis of the steering column. In other or further embodiments, one or more mass elements 180 of a mass system 170 can be of any shape other than ring-shaped or cylindrical. The center of mass of such mass elements and/or mass systems may similarly be coincident with the axis of rotation of the steering wheel armature and/or longitudinal axis of the steering column 52.

In some embodiments, the mass system 170 can comprise more than one mass element 180. In other words, the mass system 170 can comprise a plurality of mass elements 180, such as 2, 3, 4, 5, 6, or more, mass elements. In certain embodiments in which the mass system 170 comprises a plurality of mass elements 180, each mass element can be functionally coupled to the remainder of the vibration suppressor 130 via the displaceable portion of at least one spring element. In many embodiments in which the mass system comprises multiple mass elements, the mass elements may be balanced about the axis of rotation of the vibration suppressor. In some arrangements, mass systems 170 or, more generally, vibration suppressors 130, that are unbalanced relative to the axis of rotation of the steering column 52 and/or the steering wheel armature 110 might increase or otherwise negatively affect steering wheel shimmy.

In certain embodiments in which the vibration suppressor 130 is mounted on a steering wheel armature 110, the center of mass of the entire mass system 170 can be centered upon the axis of rotation of the steering wheel armature 110. In certain embodiments in which the vibration suppressor 130 is mounted on the steering column 52, the center of mass of the mass system 170 can be centered upon the longitudinal axis of the steering column 52. In still other embodiments, such as certain arrangements in which the vibration suppressor 130 comprises one or more mass elements 180 that are not ring-shaped or cylindrical, the mass elements 180 may not be centered about either the axis of rotation of the steering wheel or the longitudinal axis of the steering column. However, the one or more mass elements may be balanced relative to the axis of rotation of the steering wheel or the longitudinal axis of the steering column via one or more additional mass elements that are at opposing positions relative to the rotational axes. The mass elements may be balanced when the steering wheel is at the position that corresponds to having the wheels of the vehicle pointed straight ahead, or that corresponds to the position at which the vehicle undergoes straight-ahead travel.

The mass element 180 can be made from one or more materials of any suitable variety. In some embodiments, a mass element material may desirably be dense, such as a metal. In some embodiments this metal will be a ferrous metal, such as iron or steel or alloys thereof. In other embodiments this metal can be a non-ferrous metal. Other suitable materials are also contemplated. Having a dense material can permit the mass element 180 to have a smaller diameter, which may be advantageous in some arrangements.

In the embodiment illustrated in FIG. 2 and FIG. 3, the fixable portion 146 of the spring system 140 is shown as being affixed to a mounting base 150, which is, in turn, affixed to the steering wheel armature (e.g., at a hub 112) such that the fixable portion of the spring system is mounted in the fixed position relative to the rotational axis of the steering wheel armature.

As illustrated in FIG. 2, and when a mounting base 150 is present as part of a vibration suppressor, holes 158 within the mounting base 150 may be present to facilitate mounting of the mounting base 150 to the steering wheel armature 110. In various embodiments, the hub 112 of the steering wheel armature 110 may include a separate plate that is configured to be coupled with the vibration suppressor 130, or an entirety of the hub 112 may comprise a unitary piece of material, which may include mounting regions (e.g., openings or mounting studs) to which the vibration suppressor 130 may be affixed.

In some embodiments, the mass element 180 may include mounting hardware access holes 190, which may be larger than the holes 158 of the mounting base 150. The access holes 190 may allow tools access to the mounting hardware used for attaching (or possibly detaching) the mounting base 150, through the mounting holes in the mounting base 150, and to allow those tools to approach the mounting base as desired for fastening or tightening the mounting hardware. In certain embodiments that include mounting hardware access holes 190, the holes may be aligned with any mounting holes 158 present in the mounting base 150, when the vibration suppressor is in its resting state (i.e., when the vibration suppressor is not being subjected to rotational force about its vibration suppressor axis $A_{VS}$).

FIG. 3 depicts the vibration suppressor 130 of FIG. 2 responding to rotational force about the vibration suppressor axis $A_{VS}$. As illustrated, the mass system 170 of the vibration suppressor 130 has been axially rotated in a counter-clockwise direction relative to the mounting base 150, as depicted by an arrow, as a result of a rotational force applied. As the mass system 170 is functionally coupled to the displaceable portion of the spring system 140, the spring elements 161, 162, 163, 164 adopt a flexed position in response to the rotational force applied. Hence, FIG. 3 shows the effect of rotational force acting upon the vibration suppressor 130 as such force would be transferred from the steering wheel armature 110 to the vibration suppressor 130 when the steering system is experiencing shimmy. In some embodiments, the forces that arise in the vibration suppressor 130 are offset relative to the rotational forces that are present in the steering column 52. For example, in some embodiments, the rotational forces acting on the mass element 180 via the spring system 140 may be 180 degrees out of phase with the rotational forces acting on the steering column 52. Stated otherwise, the mass element 180 may be configured to rotate in an opposite direction relative to the steering column 52. The mass element 180 may thus counteract movement and/or forces of the steering column 52.

Comparing FIG. 3 to FIG. 2, the mounting base 150 and fixable portions of the spring element components of the spring system 140 are illustrated as being in the same, fixed location, but the mass element 180 of the mass system 170 has been rotationally displaced about the axis of the vibration suppressor $A_{VS}$. Also displaced are the displaceable portions of the spring element components of the spring system 140. The extent of the displacement shown in FIG. 3 can result from an amount of rotational force applied, as well as by both the spring constant of the spring elements of the spring system, and the moment of inertia of the mass element of the mass system. Hence, when equal amounts of rotational force are applied, vibration suppressors having spring elements with low spring constants and/or mass elements with greater mass may undergo greater rotational displacement than similarly configured vibration suppressors having spring elements with higher spring constants and/or mass elements with less mass.

In some embodiments, the vibration damping characteristics and capabilities of a disclosed vibration suppressor are "tuned" to absorb the back-and-forth axial rotational vibrations (shimmies) at a particular frequency. In some cases, that frequency to which a vibration suppressor is tuned is a frequency of vibration expected of the steering system of the vehicle in which the device is installed. In such embodiments the tuning of the vibration suppressor can be accomplished either by adjusting the properties (e.g., spring constants) of the spring elements of the resiliently flexible spring system, or by adjusting the moment of inertia of the mass element(s) of the mass system, or by some combination thereof. The adjustment of spring constants can be accomplished by altering the composition, dimensions, and/or orientation of the individual spring elements that comprise the resiliently flexible spring system of the vibration suppressor, or by increasing or decreasing the number of spring elements in the spring system. For example, increasing the number of otherwise identical spring elements can make the resiliently flexible spring system of the device more resistant to deflection by a specific amount of axial rotational force. In some embodiments, such a spring system that has been tuned to be relatively stiffer can have a higher resonant frequency and thus may counteract a corresponding higher frequency shimmy. Increasing or decreasing the spring constant may increase or decrease, respectively, the resonant frequency of the vibration suppressor.

In certain embodiments, adjustment of the moment of inertial of the mass element(s) can be accomplished by altering the composition, dimensions and orientation of the mass element(s). For example, increasing the total mass of the mass element(s) of the mass system may make the mass system of the device more resistant to deflection by a specific amount of axial rotational force. Increasing or decreasing the mass can decrease or increase, respectively, the resonant frequency of the vibration suppressor.

Figure 4:
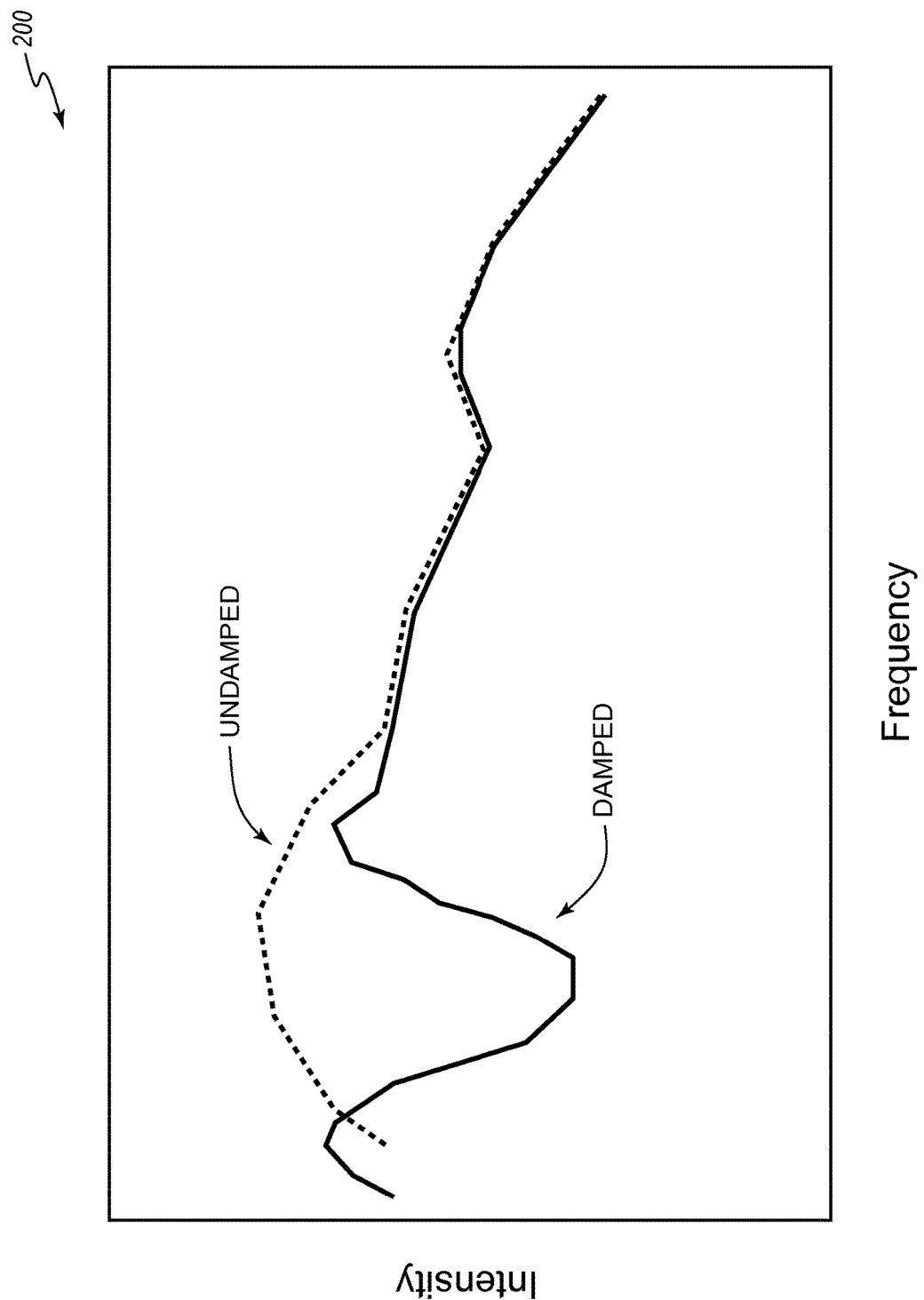
FIG. 4 is a plot showing depicting a shimmy response of a steering wheel assembly that is undamped (dashed line) or damped (solid line) through incorporation of an embodiment of a vibration suppressor such as that depicted in FIGS. 1-3.

FIG. 4 depicts a plot 200 comparing the shimmy response of a steering assembly 50 of a vehicle when it is undamped (dashed line) and when it is damped (solid line) through incorporation of an embodiment of a vibration suppressor, such as that depicted in FIG. 1. The vertical axis depicts the intensity of the shimmy, and the horizontal axis depicts the frequency at which the shimmying occurs. In the illustrated embodiment, the undamped shimmy response has two local maxima of shimmy intensity; one, which is the most intense peak, occurs at a lower frequency and the other, which is a less intense peak, occurs at a higher frequency. In the illustrated embodiment, only a single vibration suppressor is used, and that vibration suppressor is tuned to counteract the most intense peak. Accordingly, as shown by the solid line, the vibration suppressor is effective at counteracting intense shimmy in the vicinity of the intensity maximum (e.g., at frequencies immediately above and below the intensity peak). However, the shimmy intensity at the higher-frequency maximum is essentially unchanged. The frequency-specific reduction in shimmy intensity at lower frequencies in the damped steering system is consistent with what would be expected after installation of a vibration suppressor, such as that depicted in FIG. 2, that is tuned to absorb rotational vibrations in that lower frequency range. As described further below, some embodiments of vibration suppressors can be configured to reduce or counteract both local maxima of shimmy intensity.

With reference again to FIG. 1, certain embodiments of the vibration suppressor 130 are particularly well suited for attachment to, or incorporation within, steering wheel armatures. In some embodiments, the fixable portion 140 of the resiliently flexible spring system 140 can be attached to the steering wheel armature 110 either directly or via the mounting base 150, and the attachments can be attached to the steering wheel armature 110 (e.g., to the hub 112) at a position that is spaced from or apart from the steering wheel 116. As described below with respect to FIG. 10, in other embodiments a vibration suppressor can be attached to and/or encompass the steering column 52.

Certain embodiments that are attached to the steering wheel armature 110 may be attached to the side of the steering wheel armature facing the front of the vehicle, and away from an operator of the vehicle (see FIG. 1). When located in such a position the vibration suppressor is said to be mounted on "the front" of the steering wheel armature. Other embodiments are contemplated to be installed on the side of the steering wheel armature facing the rear of the vehicle, and towards the operator (see FIG. 5). When located in such a position, the vibration suppressor may be said to be mounted on "the rear" of the steering wheel armature. In some embodiments for which the vibration suppressor is installed on the side of the steering wheel armature that faces the operator, that the vibration suppressor be contained in any suitable housing portion of the steering wheel assembly and may be hidden from view by the operator. In those embodiments where the vibration dampers are installed on the side of the steering wheel armature that faces the operator, and within some sort of a housing, the vibration suppressor may be installed underneath any components, such as air bag assemblies, that are also to be installed on the side steering wheel armature facing the operator, since air bag assemblies may be located in a position that is even closer to the operator of the vehicle. In certain of such embodiments, it may be desirable that at least the mass system of the vibration suppressor is unattached to any portion of the steering wheel assembly (other than the spring system of the vibration suppressor) so as to be able to move freely relative to the steering wheel assembly when vibrations arise.

In certain embodiments where a vibration suppressor is installed on a steering wheel armature, whether in a forward- or rearward-facing position, the rotational inertia of the mass system of the vibration suppressor may be centered on the axis of rotation of the steering wheel armature. For certain embodiments in which a vibration suppressor is installed on a steering column, the rotational inertia of the mass system of the vibration suppressor may be centered on the axis of rotation of the steering column, which can correspond to the longitudinal axis of the steering column.

Figure 5:
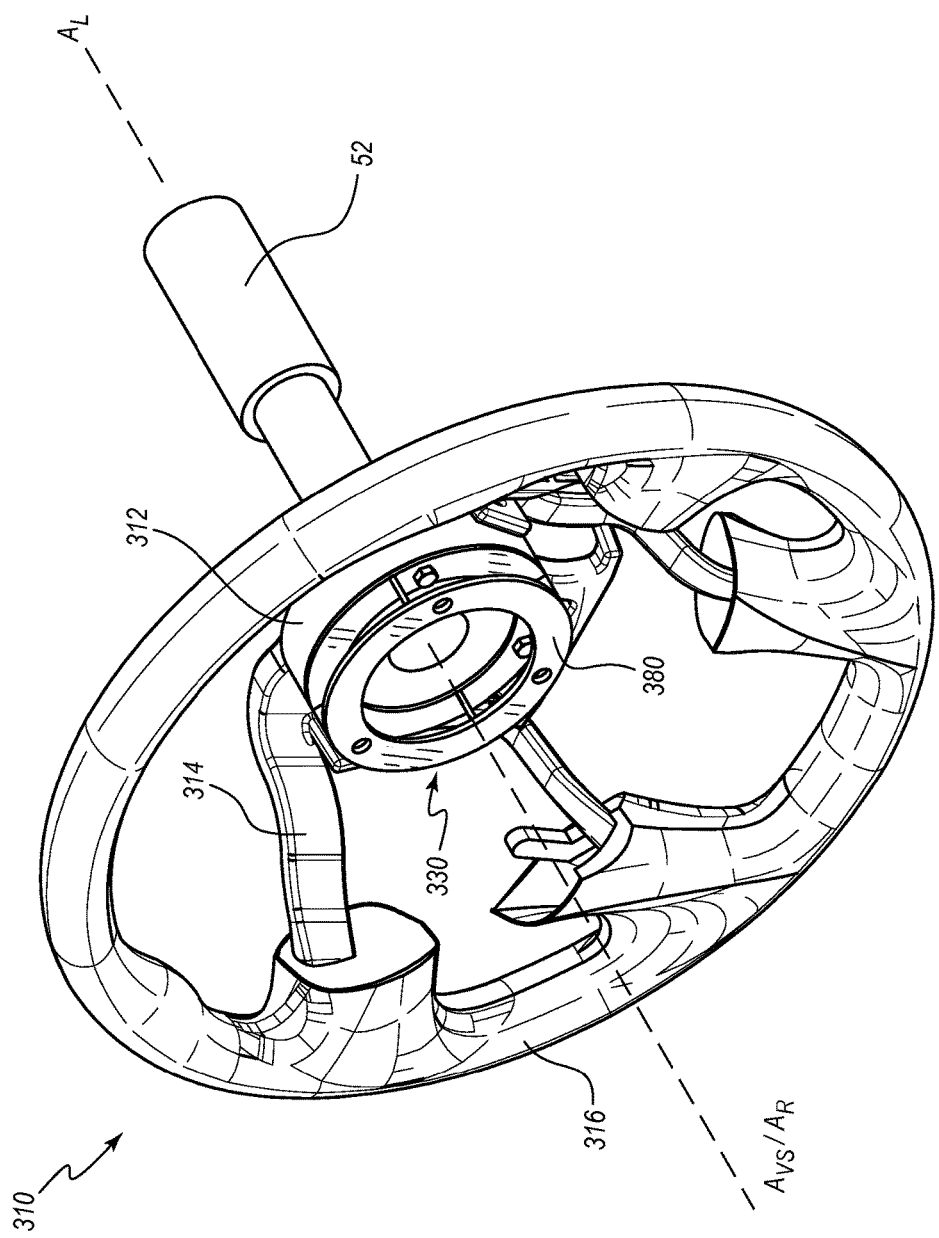
FIG. 5 is a perspective view of another embodiment of a vibration suppressor as installed distally within a steering wheel assembly on a hub of a steering wheel armature, and on the side of the steering wheel armature that faces the operator.

FIG. 5 depicts another embodiment of a vibration suppressor 330 that has been affixed to a hub 312 at the center of a steering wheel armature 310 and apart from a steering wheel 316. The vibration suppressor 330 can resemble the vibration suppressor 130 described above in certain respects. Accordingly, like features are designated with like reference numerals, with the leading digits incremented to "3." Relevant disclosure set forth above regarding similarly identified features thus may not be repeated hereafter. Moreover, specific features of the vibration suppressor 330, as well as various features of a steering assembly within which it is mounted, may not be shown or identified by a reference numeral in the drawings or specifically discussed in the written description that follows. However, such features may clearly be the same, or substantially the same, as features depicted in other embodiments and/or described with respect to such embodiments. Accordingly, the relevant descriptions of such features apply equally to the features of the vibration suppressor 330 and the related steering assembly. Any suitable combination of the features and variations of the same described with respect to the vibration suppressor 330 can be employed with the vibration suppressor 130, and vice versa. This pattern of disclosure applies equally to further embodiments depicted in subsequent figures and described hereafter, wherein the leading digits may be further incremented.

In the illustrated embodiment, the vibration suppressor 330 is mounted to a hub 312 on the side of the steering wheel armature 310 that faces towards the operator, and away from the front of the vehicle (i.e., on the back side of the steering wheel armature 310). As illustrated in this embodiment, the axis $A_{VS}$ of the vibration suppressor 330, the axis of rotation $A_R$ of the steering wheel armature 310, and the longitudinal axis of rotation $A_L$ of the steering column 52, are all collinear, coincident, or co-aligned. As illustrated in this cut-away view, the vibration suppressor is mounted deep within the steering wheel assembly 310. This configuration can allow for one or more additional components, such as an air bag assembly, to be mounted distal to the vibration suppressor 330, and more proximal to the operator of the vehicle. In further embodiments, the vibration suppressor 330 can be contained within and covered by a housing (not shown) to ensure that a mass element 380 of the vibration suppressor 330 can rotate freely about the axis $A_{VS}$.

As noted above, shimmying of a given steering assembly can intensify at a specific frequency or range of frequencies due to one or more of a number of causes. In situations where a single discrete frequency of shimmy occurs within the steering assembly of a vehicle, that individual frequency of axial rotational vibrations can be absorbed by a vibration suppressor that is tuned to that frequency. In situations where multiple discrete frequencies of shimmy co-occur within the steering assembly of the same vehicle, a vibration suppressor may desirably be tuned to multiple resonant frequencies that can absorb energy at each of the vibration peaks. In some embodiments, multi-mode vibration suppressors can be formed of multiple discrete vibration suppressors that operate in parallel. In other or further embodiments, multiple vibration suppressors, or components thereof, can be combined into a single vibration suppressor, and the component portions can operate in series. Multi-mode vibration suppressors can reduce rotational vibrations at each peak shimmying frequency. Illustrative embodiments of vibration suppressors that have portions that operate in parallel or in series are described hereafter with respect to FIGS. 6 and 7, respectively.

Figure 6:
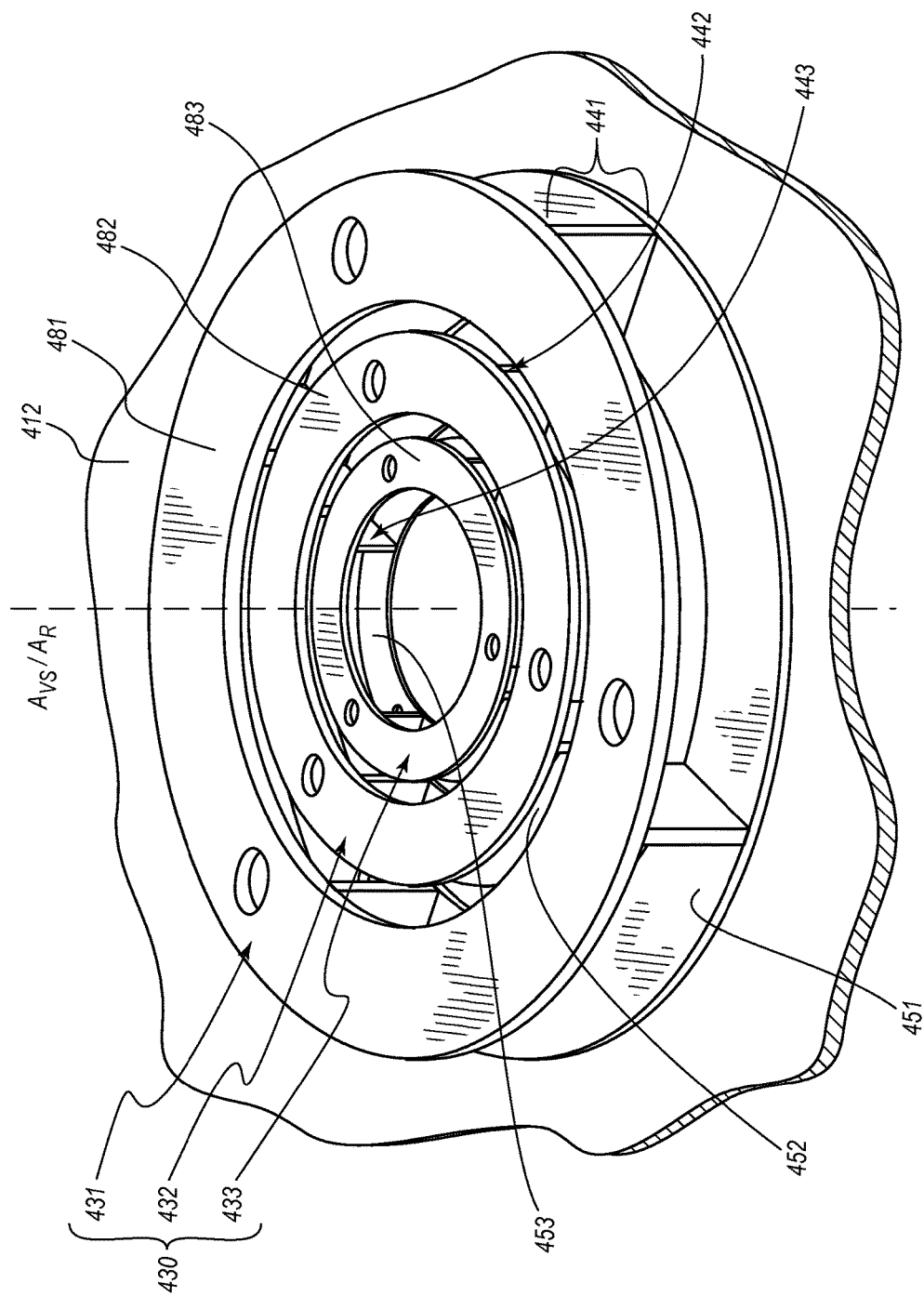
FIG. 6 is a perspective view of another embodiment of a vibration suppressor that comprises an assembly of three nested vibration suppressors installed on the hub of a steering wheel armature to work in parallel, with each vibration suppressor designed to resonate at a specific frequency of rotational vibration.

FIG. 6 depicts an embodiment of a vibration absorber or vibration suppressor 430, which may also be described as a multi-mode vibration suppressor or as a vibration suppressor assembly. The vibration suppressor 430 includes three nested vibration absorbers 431, 432, 433, which, in the illustrated embodiment, are concentrically mounted to a single hub 412 of a steering wheel armature by way of three separate mounting bases 451, 452, 453, respectively. Each vibration absorber 431, 432, 433 is oriented such that a portion thereof can vibrate about a single axis of rotation $A_{VS}$ that is coincident and coaligned with the axis of rotation of a steering wheel armature $A_R$ when installed. As illustrated, each vibration absorber 431, 432, 433, comprises a resiliently flexible spring system 441, 442, 443 that is affixed to one of the mounting bases 451, 452, 453, respectively, and further, is coupled to a ring-shaped mass element 481, 481, 483, respectively. In the illustrated embodiment, the mass elements 481, 482, 483 are transverse to the axis of rotation of the steering wheel armature $A_R$.

In this illustrated embodiment, each of the three nested vibration absorbers 431, 432, 433 is tuned to damp a distinct frequency of rotational vibration about the axis of rotation of a steering wheel armature $A_R$, such that each vibration absorber 431, 432, 433 functions in parallel with the other two vibration absorbers, so that the entire vibration absorber assembly 430 effectively lessens steering wheel shimmy at three distinct frequencies. The three mass elements 481, 482 and 483 are free to respond independently of one another to movements of the hub 412. Each mass element 481, 482, 483 moves independently of the other mass elements and is separately affixed to the hub 412 via the separate spring systems 441, 442, 443.

In the illustrated embodiment, three separate mounting bases 451, 452, 453 are used. In other embodiments, the vibration absorbers 431, 432, 433 may have a single common mounting base, which may facilitate installation of the vibration suppressor 430.

Figure 7:
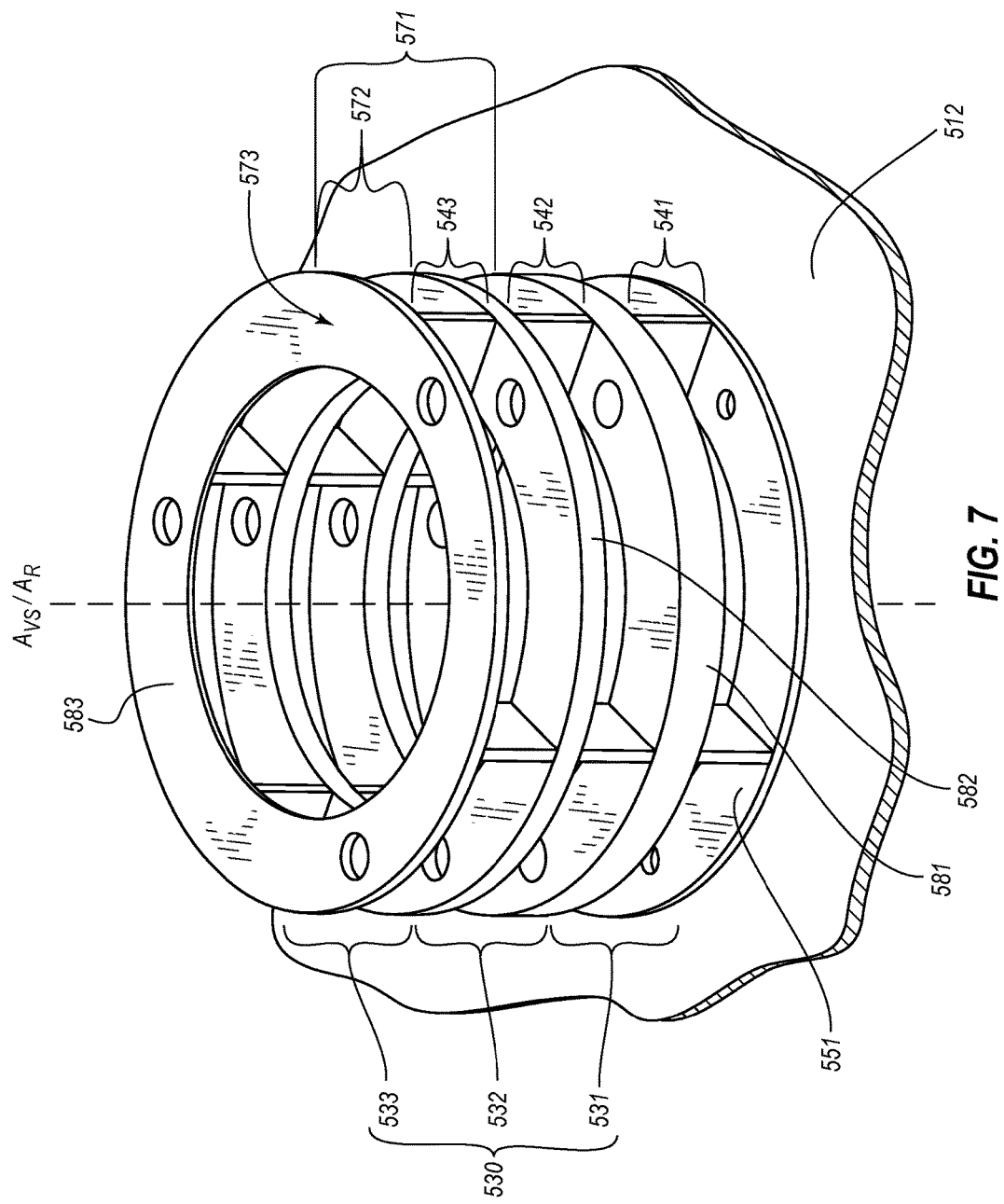
FIG. 7 is a perspective view of another embodiment of a vibration suppressor that includes an assembly of three stacked vibration absorbers, which is depicted installed on the hub of a steering wheel armature to resonate at various frequencies of rotational vibration.

FIG. 7 depicts another embodiment of a vibration suppressor 530, which may also be described as a multi-mode vibration suppressor or as a vibration suppressor assembly. The vibration suppressor 530 may be viewed as having three stacked vibration absorbers 531, 532, 533 that are concentrically mounted to a single hub 512, through a single mounting base 551. The vibration absorbers 531, 532, 533 can be mounted to the hub 512 about a single axis of rotation $A_{VS}$ that is coincident and coaligned with the axis of rotation of a steering wheel armature $A_R$. As illustrated, each vibration absorber 531, 532, 533, comprises a resiliently flexible spring system 541, 542, 543. In the illustrated embodiment, the mass system 573 of the upper-most vibration suppressor 533 comprises a single ring-shape mass element 583 that is transverse to the axis of rotation of the steering wheel armature $A_R$. The middle vibration absorber 532 comprises a ring-shaped mass element 582. However, the mass system 572 of the middle vibration absorber 532 may also be seen as including the entire vibration suppressor 533 attached above it. Similarly, the mass system 571 of the bottom vibration suppressor 531 comprises a ring-shaped mass element 581, and may also be seen as including both vibration absorbers 532, 533 that are mounted above the mass element 581.

In the illustrated embodiment, each of the three stacked vibration absorbers 531, 532, 533 can be tuned to damp a particular frequency of rotational vibration about the axis of rotation of a steering wheel armature $A_R$, and may function in series with the other two vibration absorbers, such that the entire vibration absorber assembly 530 would effectively lessening steering wheel shimmy at three different frequencies. The vibration suppressor 530 may further include more complicated vibration modes, such as modes in which the central mass element 582 rotates in a direction that is opposite from the direction in which the upper and lower mass elements 583, 581 rotate. Accordingly, the vibration suppressor 530 may have more than three resonant frequencies, and may be configured to dampen shimmy at each of the resonant frequencies.

Other or further embodiments can include any suitable combination of the features described with respect to FIGS. 6 and 7. For example, in some embodiments, a vibration suppressor can include two or more, three or more, four or more, or five or more discrete vibration suppressors (e.g., vibration suppressors that are nested or are otherwise operable in parallel) or two or more, three or more, four or more, or five or more vibration suppressors components that are combined in a single unit and which may operate in series and/or in other vibrational modes. The number of vibrational modes of a vibration suppressor can be less than, the same as, or greater than the number of mass elements that are present in the vibration suppressor.

Figure 8:
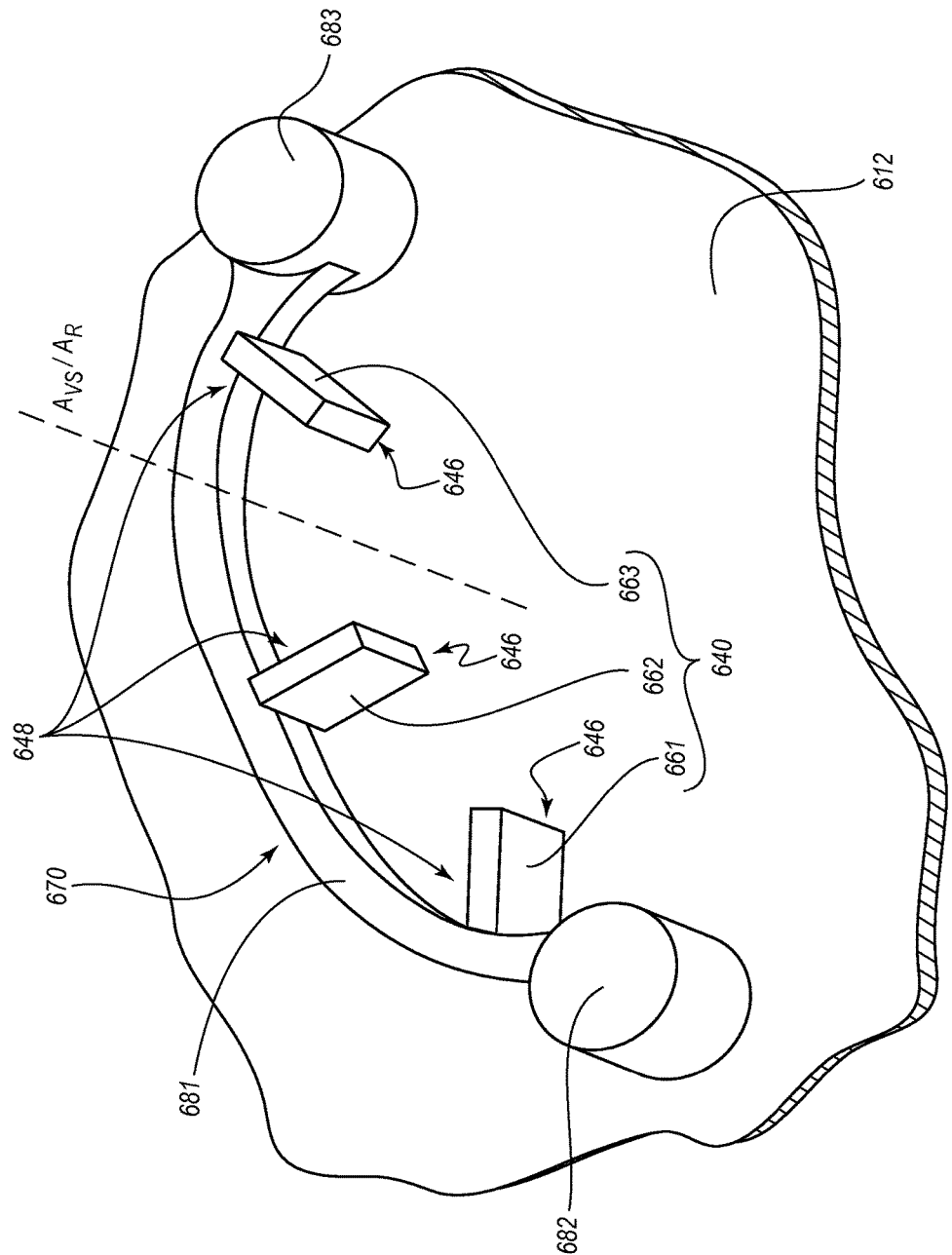
FIG. 8 is a perspective view of another embodiment of a vibration suppressor installed within steering wheel assembly shown in a natural or unperturbed state.
Figure 9:
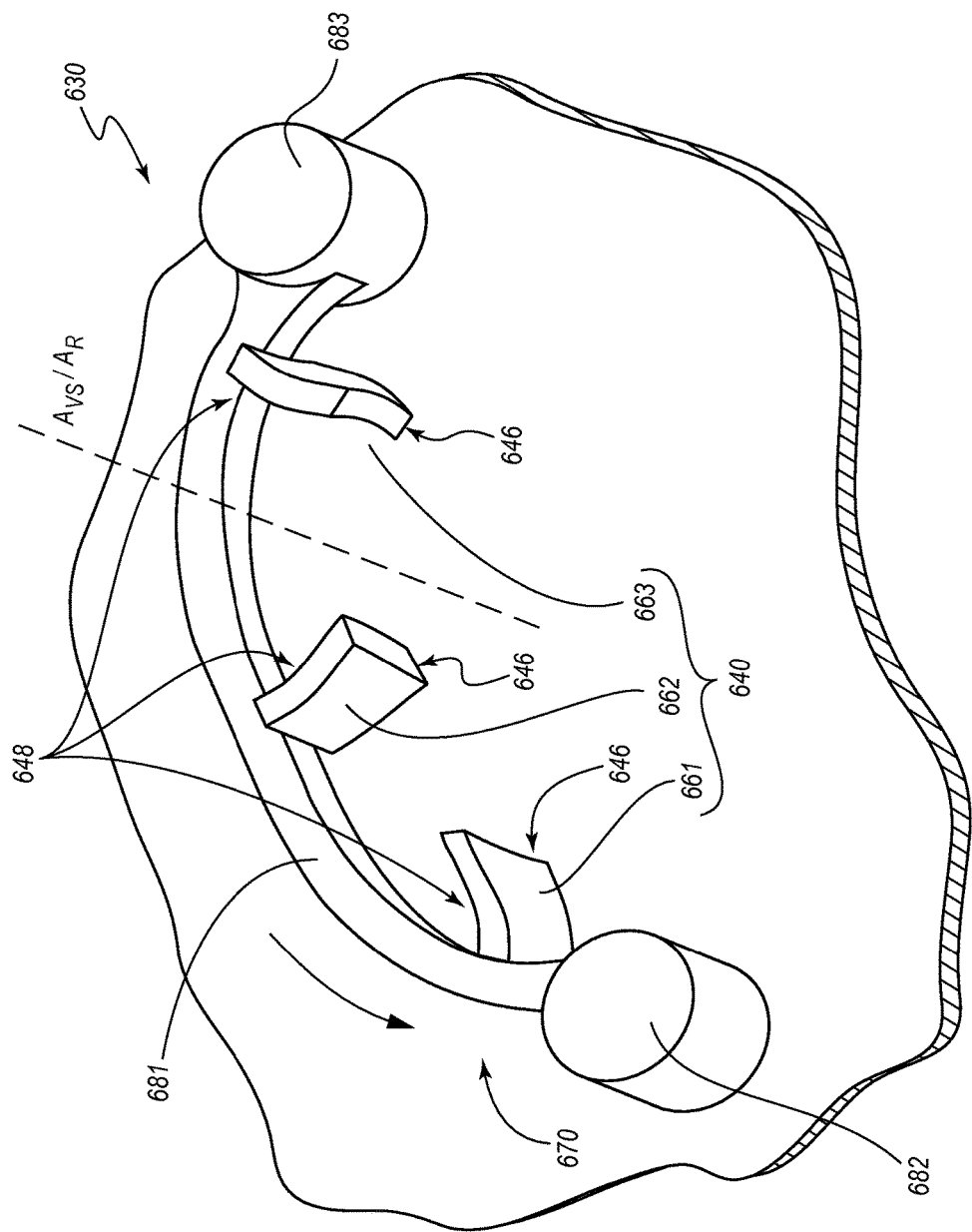
FIG. 9 is another perspective view of the vibration suppressor of FIG. 8 shown in a displaced or perturbed state in which part of the device has undergone rotational flexion relative to the rest of the device in response to rotational forces through the steering column and steering wheel armature.

FIG. 8 and FIG. 9 depict another embodiment of vibration suppressor 630, which can differ from the embodiments previously described. In the illustrated embodiment, the vibration suppressor 630 includes a dumbbell-shaped mass system 670, which includes a mass element 681 that is shaped as an arcuate rod or bar that extends between two further mass elements 682, 683. The illustrated mass elements 682, 683 are substantially cylindrical. The vibration suppressor 630 includes a spring system 640 that includes three spring elements 661, 662, 663, each of which includes a fixable portion 646 and a displaceable portion 648. In this illustrated embodiment, the fixable portion 646 of each spring element 661, 662, 663 component of the spring system 640 is directly affixed to a hub 612. Specifically, in this embodiment the fixable portion is a single edge in the shortest dimension of each spring element, which can be affixed to a hub 612 of a steering wheel armature by any suitable manner, including, for example, spot welding, fasteners, and/or adhesives. Accordingly, the spring elements 661, 662, 663 can be affixed to the hub 612 at a position that is closest to a rotational axis $A_{VS}$ of the vibration suppressor.

FIG. 8 depicts the vibration suppressor 630 at rest or in a natural, resting, or unperturbed state, and FIG. 9 depicts the vibration suppressor 630 responding to rotational force about the rotational axis $A_{VS}$ of the vibration suppressor. Comparing FIG. 9 to FIG. 8, the hub 612 and fixable portions 646 of the spring element components 661, 662, 663 of the spring system 640 are in the same, fixed location relative to the hub 612, but the mass element 681, 682, 683 of the mass system 670 has been rotationally displaced (as represented by an arrow) about the rotational axis $A_{VS}$ of the vibration suppressor. Also displaced are the displaceable portions 648 of the spring elements 661, 662, 663 of the spring system 640. The extent of the displacement can result from the amount of rotational force applied, the spring constant of the spring elements, and/or the mass of the mass elements.

Figure 10:
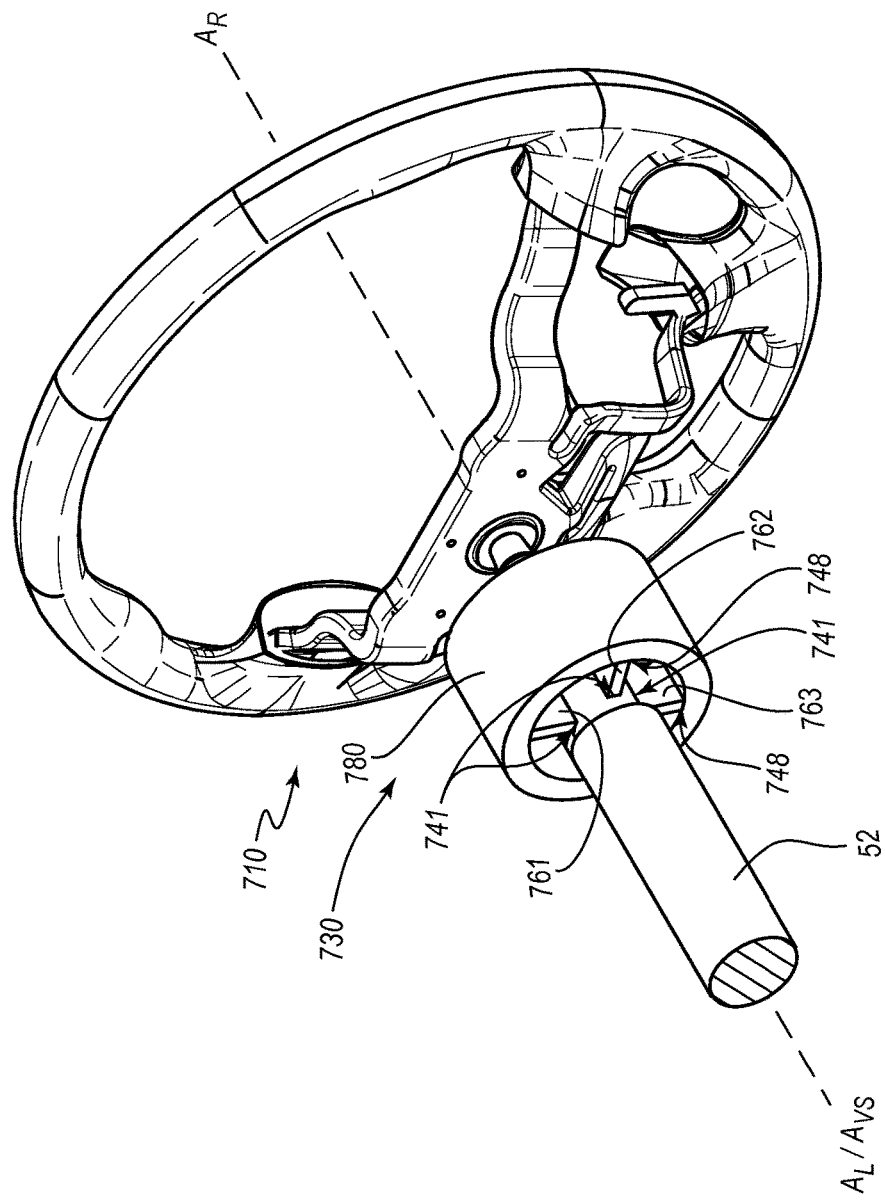
FIG. 10 is a perspective view of another embodiment of a vibration suppressor that is shown installed concentrically around, and fully encompassing a steering column.

FIG. 10. depicts another embodiment of a vibration suppressor 730 that is mounted directly to the steering column 52 of the vehicle, rather than to a steering wheel armature 710. As illustrated, the mass system of this embodiment comprises a single mass element 780 that is a cylinder. This mass element 780 is affixed to the steering column 52 by four equally spaced spring elements 761, 762, 763 (the fourth spring element is hidden from view). As components of the spring system of this embodiment, each spring element comprises a fixable portion 741 that is directly affixed to the steering column 52, and a displaceable portion 748, to which the mass element 780 of the mass system is functionally coupled. As illustrated, in this embodiment, the axis of rotation of the vibration suppressor $A_{VS}$ is coincident and coaligned with the longitudinal axis of the steering column $A_L$, since the mass element 780 is configured to be concentric to the steering column 52. Additionally, the axis of rotation of the steering wheel armature 710 $A_R$ is coincident and coaligned with both the axis of rotation of the vibration suppressor $A_{VS}$ and the longitudinal axis of the steering column $A_L$, since the steering wheel armature 710 is affixed directly to the end of the steering column 52.

FIG. 11 depicts another embodiment of a vibration suppressor 830 comprising a spring system 840 that includes four spring elements 861, 862, 863, 864 mounted in a fixed position on a mounting base 850 that is attached to a hub 812, and functionally coupled to a mass system 870 that includes four distinct mass elements 881, 882, 883, 884, each attached to a single spring element 861, 862, 863, 864. In the illustrated embodiment, each spring element consists of a blade mounted at a position that is radially spaced from the axis of rotation of a steering wheel armature $A_R$, and with a single mass element affixed to it. Each spring element 861, 862, 863, 864 has a fixable portion 846 and a displaceable portion 848. The fixable portion is mounted in a fixed position on a mounting base 850 and the displaceable portion 848 is attached to a mass element 881, 882, 883, 884. As illustrated, the spring elements 861, 862, 863, 864 can resist radial movement of each mass element 881, 882, 883, 884 relative to the axis of rotation $A_R$ of steering wheel armature to which the depicted vibration suppressor is attached. However, the spring elements 861, 862, 863, 864 can permit rotational movement of the mass elements 881, 882, 883, 884 about the axis of rotation $A_R$ when the mounting base 850 of the vibration suppressor 830 is affixed to the hub 812. In other embodiments, the mounting base 850 may be omitted, and the spring elements 861, 862, 863, 864 can be directly attached to the hub 812 in any suitable manner.

Various embodiments of vibration suppressors disclosed herein may be originally manufactured with a steering wheel armature, and the armature with the vibration suppressor may be distributed by the manufacturer. In some embodiments, the vibration suppressors may be provided separately from the steering wheel armatures and may be added thereto as an after-market or retrofitting device.

Any suitable method may be employed to form a vibration suppressor or vibration suppressor assembly as disclosed herein. For example, in various illustrative methods, the devices can be formed via laser cutting, die cutting, or milling and machining. In some instances the spring elements are made of metal that is welded to other parts of the shimmy damper or vibration suppressor assembly. Alternatively, the spring elements are attached to a mounting base through any appropriate means, and the mounting base is directly affixed to a steering wheel armature of a steering column.

References to approximations are made throughout this specification, such as by use of the terms "about," "approximately," or "substantially." For each such reference, it is to be understood that, in some embodiments, the value, feature, or characteristic may be specified without approximation. Stated otherwise, the terms of approximation include within their scope the exact feature modified by the term of approximation. For example, it is noted that in various embodiments, the vibration suppressor can be substantially planar. It is thus understood that in certain of such embodiments, a portion of the device can be exactly planar.

Any methods disclosed herein include one or more steps or actions for performing the described method. The method steps and/or actions may be interchanged with one another. In other words, unless a specific order of steps or actions is required for proper operation of the embodiment, the order and/or use of specific steps and/or actions may be modified.

Reference throughout this specification to "an embodiment" or "the embodiment" means that a particular feature, structure or characteristic described in connection with that embodiment is included in at least one embodiment. Thus, the quoted phrases, or variations thereof, as recited throughout this specification are not necessarily all referring to the same embodiment.

Similarly, it should be appreciated that in the above description of embodiments, various features are sometimes grouped together in a single embodiment, figure, or description thereof for the purpose of streamlining the disclosure. This method of disclosure, however, is not to be interpreted as reflecting an intention that any claim require more features than those expressly recited in that claim. Rather, as the following claims reflect, inventive aspects lie in a combination of fewer than all features of any single foregoing disclosed embodiment. Thus, the claims following this Detailed Description are hereby expressly incorporated into this Detailed Description, with each claim standing on its own as a separate embodiment. This disclosure includes all permutations of the independent claims with their dependent claims.

Recitation in the claims of the term "first" with respect to a feature or element does not necessarily imply the existence of a second or additional such feature or element. Elements recited in means-plus-function format are intended to be construed in accordance with 35 U.S.C. §112(f). It will be apparent to those having skill in the art that changes may be made to the details of the above-described embodiments without departing from the underlying principles of the vibration suppressors disclosed herein. Embodiments of such vibration suppressor in which an exclusive property or privilege is claimed are defined as follows.

The invention claimed is:

1. A vibration suppressor comprising:
   a ring-shaped mass element that is configured to be mounted at an exterior of a steering wheel of a vehicle, wherein a rotational inertia of the ring-shaped mass element is configured to be centered on a longitudinal axis defined by a steering column of the vehicle; and
   a spring system comprising a plurality of spring elements, the spring system configured to be mounted at an exterior of the steering wheel, each spring element of the plurality of spring elements comprising:
     a first portion that is configured to be mounted in a fixed position relative to the steering column to rotate in unison with the steering column about the longitudinal axis; and
     a second portion coupled to the ring-shaped mass element such that each spring element of the plurality of spring elements is to be disposed between the ring-shaped mass element and the steering wheel, the second portion configured to be displaced relative to the first portion and relative to the steering wheel,
   wherein a length of each spring element of the plurality of spring elements along a first plane that radiates from the longitudinal axis of the steering column is greater than a width of each spring element of the plurality of spring elements along a second plane that is substantially parallel to a perimeter of the ring-shaped mass element adjacent each spring element of the plurality of spring elements, and wherein a height of each spring element of the plurality of spring elements along the first plane that radiates from the longitudinal axis of the steering column is greater than the width of each spring element of the plurality of spring elements, such that the plurality of spring elements are configured to resist axial movement and radial movement of the ring-shaped mass element relative to the longitudinal axis of the steering column and are configured to permit rotational movement of the ring-shaped mass element about the longitudinal axis of the steering column,
   such that the vibration suppressor is tuned to absorb rotational vibrations about the longitudinal axis of the steering column when the first portion of each spring element of the plurality of spring elements is mounted in the fixed position relative to the steering column.

2. The vibration suppressor of claim 1, wherein the ring-shaped mass element is configured to fully encompass the longitudinal axis of the steering column when the first portion of each spring element of the plurality of spring elements is mounted in the fixed position relative to the steering column.

3. The vibration suppressor of claim 2, wherein the mass element comprises a ring that is configured to be oriented transversely to the longitudinal axis of the steering column when the first portion of each spring element of the plurality of spring elements is mounted in the fixed position relative to the steering column.

4. The vibration suppressor of claim 1, wherein each of the spring elements comprise a blade that is attached to the ring-shaped mass element, wherein the ring-shaped mass element is configured to be oriented transversely to the longitudinal axis of the steering column when the first portion of each spring element of the plurality of spring elements is mounted in the fixed position relative to the steering column.

5. The vibration suppressor of claim 1, wherein the spring system further comprises a mounting base to which the first portion of each spring element is fixed, the mounting base to be mounted in a fixed position relative to the steering column.

6. The vibration suppressor of claim 5, wherein the mounting base is ring-shaped, and wherein each spring element of the plurality of spring elements extends between the mounting base and the ring-shaped mass element.

7. The vibration suppressor of claim 1, wherein the first portion of each spring element of the plurality of spring elements is configured to be fixed to a steering wheel armature at a position that is spaced from the steering wheel.

8. The vibration suppressor of claim 1, wherein the first portion of each spring element of the plurality of spring elements is configured to be directly attached to the steering column.

9. The vibration suppressor of claim 1, wherein the ring-shaped mass element is configured to be balanced about the longitudinal axis of the steering column when the first portion of each spring element of the plurality of spring elements is mounted in the fixed position relative to the steering column.

10. The vibration suppressor of claim 1, wherein the spring system is a first spring system and the ring-shaped mass element is a first mass element,
wherein the first spring system and the first mass element cooperatively have a first resonant frequency,
wherein the vibration suppressor further comprises:
a second resiliently flexible spring system that is configured to be mounted at an exterior of the steering wheel of the vehicle, the second spring system comprising a second plurality of spring elements, each spring element of the second plurality of spring elements comprising a first portion and a second portion that is configured to be displaced relative to the first portion; and
a second mass element coupled to the second portion of each spring element of the second plurality of spring elements of the second spring system, wherein the second mass element is to be displaced relative to the first portion of the second plurality of spring elements and relative to the steering wheel, and
wherein the second spring system and the second mass element cooperatively have a second resonant frequency that differs from the first resonant frequency.

11. The vibration suppressor of claim 10, wherein the first spring system and the first mass element are nested within the second spring system and the second mass element.

12. The vibration suppressor of claim 10, wherein the first portion of the second spring system is mounted in a fixed position relative to the first mass system.

* * * * *